(12) United States Patent
Levine

(10) Patent No.: US 6,612,264 B2
(45) Date of Patent: Sep. 2, 2003

(54) DOG LEASH TRAINING DEVICE

(76) Inventor: Bernard I. Levine, 26600 Woodbury Dr., Torrance, CA (US) 90503

( * ) Notice: Subject to any disclaimer, the term of this patent is extended or adjusted under 35 U.S.C. 154(b) by 0 days.

(21) Appl. No.: 10/057,894

(22) Filed: Jan. 29, 2002

(65) Prior Publication Data

US 2003/0140871 A1 Jul. 31, 2003

(51) Int. Cl.$^7$ .............................................. A01K 27/00
(52) U.S. Cl. ............................................ 119/795; 119/719
(58) Field of Search ............................ 119/719, 724, 119/795, 797; 472/53, 56; 43/17.1, 42.72

(56) References Cited

U.S. PATENT DOCUMENTS

| 3,072,097 A | * | 1/1963 | Morchand | 116/137 A |
| 3,468,290 A | * | 9/1969 | Elliot | 119/709 |
| 3,570,457 A | * | 3/1971 | Curtis | 119/719 |
| 4,681,303 A | * | 7/1987 | Grassano | 119/769 |
| 5,456,213 A | * | 10/1995 | Beauchamp | 119/793 |
| 5,873,328 A | * | 2/1999 | Campbell | 119/795 |
| 6,003,474 A | * | 12/1999 | Slater et al. | 119/792 |

* cited by examiner

Primary Examiner—Charles T. Jordan
Assistant Examiner—Bret Hayes
(74) Attorney, Agent, or Firm—Irving Keschner

(57) ABSTRACT

A device which functions as a leash training aid providing a humane effective technique for training an animal, such as a dog, to walk on a leash. The device comprises a cylindrically shaped member having an internal chamber and openings at each end. The threaded shaft formed on an eyebolt extends through one opening into the chamber, the end of the shaft being secured within the chamber by a locknut. A coiled spring surrounds the threaded shaft within the chamber, a portion of the threaded shaft operatively engaging a threaded hole formed in one portion of the shaped member. A second eyebolt is provided to couple the dog collar to the device.

4 Claims, 1 Drawing Sheet

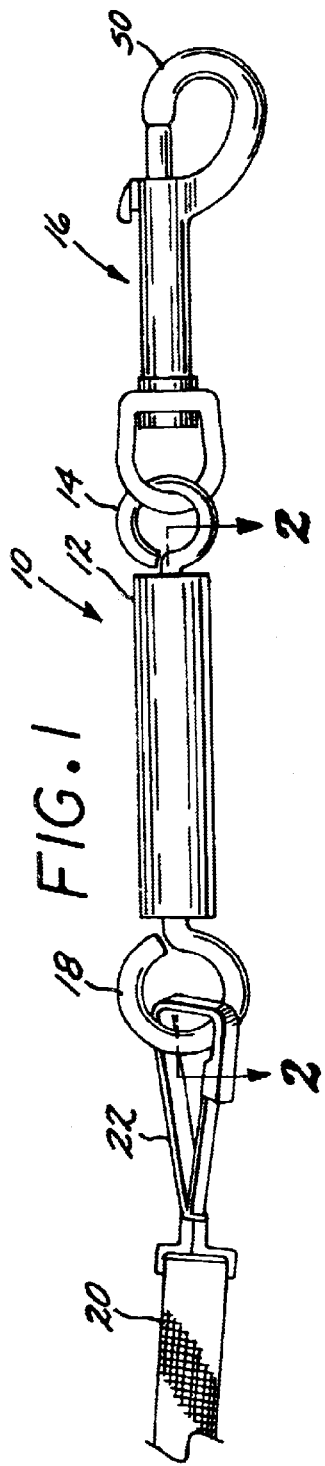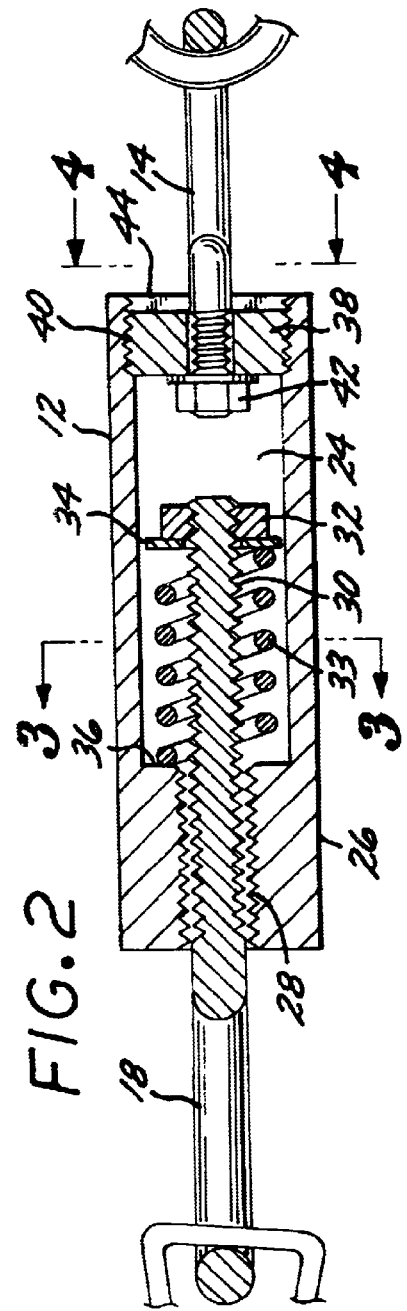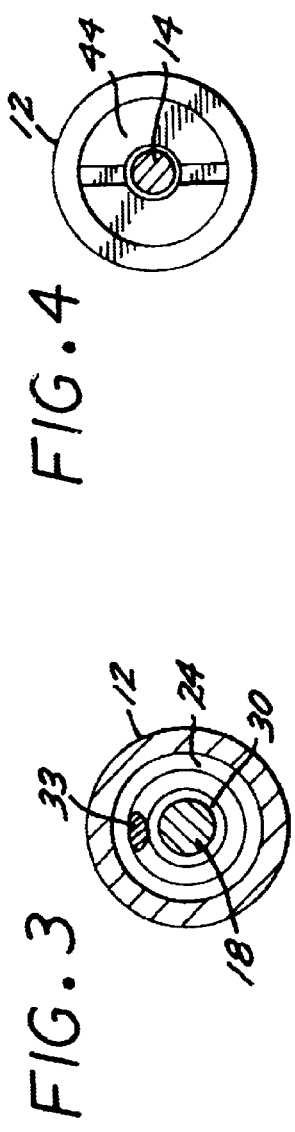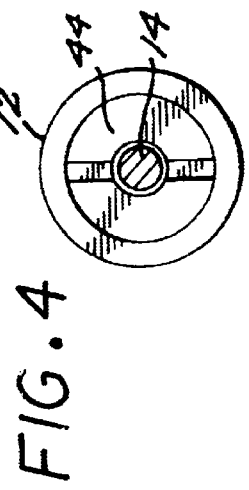

DOG LEASH TRAINING DEVICE

BACKGROUND OF THE INVENTION

1. Field of the Invention

The present invention provides an improved mechanical choke collar for dogs wherein a pull on the dog leash causes the choke collar to emit a chirping sound.

2. Description of the Prior Art

A common method for training and controlling animals on a leash is the choke collar or choke chain. Choke collars restrain animals by choking off breathing to a degree proportional to the strain imposed by the animal on the collar. The choking pressure is eased as the animal reduces its pull on the leash.

Choke collars may not be the ideal way for training and controlling animals since the animal, in fighting the choke collar, can damage its skin and/or coat.

A device that eliminates the problems noted above is disclosed in U.S. Pat. No. 5,494,002 to Greene. The device comprises an elongate body having retaining rings to couple the body to a leash. A trigger member extends from the body and is in contact with the leash. The trigger, responsive to a force exerted thereon by the leash being pulled by the animal, activates a sound generator. The emitted sound startles the animal so that it learns to avoid the sound and walk safely at the side of the owner.

Although the Greene device avoids the disadvantages of a conventional dog collar as noted above, it is relatively expensive and complicated to operate since it requires a piezoelectric buzzer, a battery and housings for these items.

What is desired is to provide a device which functions as a choke collar but does not have the disadvantages of prior art collars noted hereinabove.

SUMMARY OF THE INVENTION

The present invention provides a simple device which when tensioned limits the sound of a choke collar while eliminating the collar tightening that a conventional choke collar applies. The device provides a humane and effective technique for training an animal, such as a dog, to walk on a leash.

The device comprises a cylindrically shaped member having an internal chamber and openings at each end. The threaded shaft formed on an eyebolt extends through one opening into the chamber, the end of the shaft being secured within the chamber by a locknut. A coiled spring surrounds the threaded shaft within the chamber, and a portion of the threaded shaft operatively engaging a threaded hole formed in one portion of the shaped member. A second eyebolt is provided to couple the animal collar or harness to the device.

The present invention thus provides a simple and cost efficient animal control device which is humane and effective.

DESCRIPTION OF DRAWINGS

For a better understanding of the present invention as well as other objects and further features thereof, reference is made to the following description which is to be read in conjunction with the accompanying drawing therein:

FIG. 1 is a perspective view of the leash training device of the present invention;

FIG. 2 is a cross-sectional view along line 2—2 of FIG. 1;

FIG. 3 is a cross-sectional view along line 3—3 of FIG. 2; and

FIG. 4 is a view along line 4—4 of FIG. 2.

DESCRIPTION OF THE INVENTION

Referring now to FIG. 1, leash training device 10 of the present invention comprises a metal, cylindrically shaped member 12 having a first eyebolt 14 coupled to clip member 16 and a second eyebolt 18 coupled to leash 20 via clip 22.

FIG. 2 is a cross-sectional view illustrating the details of the present invention. In particular, member 12 has chamber 24 formed therein, the front portion 26 of member 12 having a threaded portion 28. The threaded portion 30 of eyebolt 18 extends into chamber 24 through a sliding fit in threaded portion 30 and is secured to locknut 32. Threaded portion 30 is surrounded by coil spring 33 positioned between washer 34 and surface 36 of front portion 26 in a manner such that locknut 32 secures the spring 33 within chamber 24. The size of thread 30 is smaller than the thread formed on threaded portion 28 to form a sliding fit.

Eyebolt 14 is secured to member 12 through threaded collar member 38 threaded into a threaded portion 40 formed on the inside surface of member 12. A locknut 42 secures eyebolt 14 to collar 38. End cover 44 encloses the end portion of member 12 as illustrated.

In use, clip 50 is attached to the collar of an animal, such as a dog, and leash 20 is held by the person walking the dog. When the person wants the attention of the dog, leash 20 is pulled toward the person, a chirping sound being generated by the interaction between the threaded portions 28 and 30, alterting the dog to the person's command without choking the dog.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. An animal leash training device comprising a cylindrically shaped member having first and second ends and an internal chamber;

openings being formed in said first and second end, said shaped member having a threaded portion adjacent said first opening;

a threaded shaft extending through said first end into said chamber;

a spring member surrounding said threaded shaft within said chamber; and a first member for coupling said threaded shaft to said animal leash, the interaction of said threaded shaft with the threaded portion of said shaped member causing a sound to be emitted when said leash is pulled away from said cylindrically shaped member.

2. The training device of claim 1 further including a member for securing said threaded shaft within said chamber.

3. The training device of claim 1 wherein said threaded shaft moves from a first position relative to said threaded portion of said shaped member to a second position when said leash is pulled away from said cylindrically shaped member.

4. The training device of claim 3 wherein said spring member returns said threaded shaft to said first position when said leash is not being pulled.

* * * * *

UNITED STATES PATENT AND TRADEMARK OFFICE
CERTIFICATE OF CORRECTION

PATENT NO. : 6,612,264 B2
DATED : September 2, 2003
INVENTOR(S) : Bernard I. Levine It is certified that error appears in the above-identified patent and that said Letters Patent is hereby corrected as shown below:

<u>Title page,</u>
Item [75], the address of the inventor should appear as follows:

-- 2600 Woodbury Drive, Torrance, CA 90503 --.

<u>Column 1,</u>
Line 38, "limits" should appear as follows: -- emits --.

Signed and Sealed this

Twenty-seventh Day of January, 2004

JON W. DUDAS
*Acting Director of the United States Patent and Trademark Office*